United States Patent [19]

Reynolds et al.

[11] Patent Number: 5,074,522
[45] Date of Patent: Dec. 24, 1991

[54] BALL VALVE HAVING IMPROVED INHERENT RANGEABILITY

[75] Inventors: David C. Reynolds, Williamsport, Pa.; Robert H. Osthues, Holden, Mass.

[73] Assignee: Worcester Controls Corporation, Marlborough, Mass.

[21] Appl. No.: 666,921

[22] Filed: Mar. 11, 1991

[51] Int. Cl.$^5$ .......................... F16K 5/06; F16K 5/10; F16K 47/14
[52] U.S. Cl. ................................ 251/127; 137/625.3; 251/368
[58] Field of Search ........... 251/127, 315, 209, 625.32, 251/625.3

[56] References Cited

U.S. PATENT DOCUMENTS

| | | |
|---|---|---|
| 3,786,837 | 1/1974 | Pipkins . |
| 3,880,191 | 4/1975 | Baumann . |
| 4,085,774 | 4/1978 | Baumann . |
| 4,271,866 | 6/1981 | Bey ................................ 251/127 X |
| 4,540,025 | 9/1985 | Ledeen et al. . |
| 4,889,163 | 12/1989 | Engelbertsson . |

OTHER PUBLICATIONS

"Series CPT Characterized Seat Control Valve", Worcester Controls 12/89.

*Primary Examiner*—Arnold Rosenthal
*Attorney, Agent, or Firm*—Pollock, Vande Sande and Priddy

[57] ABSTRACT

A ball valve having improved inherent rangeability comprises a floating ball of conventional design that is rotatable through substantially 90° between a pair of seats respectively located adjacent the upstream and downstream sides of the valve within a valve housing. At least one of the seats is a one-piece lubricant-impregnated metal seat configured to provide a concave central surface portion that makes full-face direct sealing contact with the ball, and which defines multiple spaced holes that extend through the seat to increase the fluid-to-metal contact of fluid passing through the seat thereby to reduce the pressure between the upstream and downstream sides of the valve. The pattern of holes may be such as to cause the valve to exhibit an equal percentage of flow characteristic for at least a portion of the ball rotation and/or a linear flow characteristic for at least a portion of the ball rotation. When only one such multiple hole seat is used in the valve, the other seat can be a standard round hole seat, or a slotted seat, or a V-seat. In each case, the direct sealing contact between the ball and the multiple hole seat prevents fluid leakage from the ball bore through any holes in the seat that are covered by a surface portion of the ball whereby the valve exhibits improved inherent rangeability.

7 Claims, 2 Drawing Sheets

BALL VALVE HAVING IMPROVED INHERENT RANGEABILITY

BACKGROUND OF THE INVENTION

The present invention relates to ball valves of known type comprising a housing having an interior cavity located between and communicating with a pair of fluid flow channels to define an axial flow passage extending through the housing, a ball located in the interior cavity, the ball having an axially-directed bore extending therethrough and being a floating ball that is rotatable through substantially 90° about an axis of rotation transverse to the flow passage whereby the bore may be selectively aligned with or disposed transverse to the axial flow passage in the housing to control the flow of fluid therethrough. The ball cooperates with a pair of seats that are supported by the housing adjacent the upstream and downstream sides of the cavity, respectively, for sealing engagement with the housing and ball. When the seats are round hole seats, such valves are "high recovery" valves, i.e., most of the fluid pressure available upstream of the valve is still available downstream of the valve after the media, i.e., fluid passes through the valve.

Ball valves of the types described above are inherently low loss devices. They exhibit excellent performance for on/off service, but do not exhibit desirable characteristics for control service. In control service, the ball position is changed, i.e., modulated to vary the flow through the valve or to vary the pressure downstream of the valve. High recovery valves are increasingly being used for such service because their 90° operation makes automation simple. The control that can be achieved by such valves, however, is inferior to traditional rising stem control valves in three areas, i.e., rangeability, flow characteristic and pressure recovery. The term "flow characteristic" is defined as the relation between flow through the valve and percent rated travel as the valve position is varied from 0 to 100%. The term "inherent flow characteristic", with which the present invention is primarily concerned, means the flow characteristic of the valve when constant pressure drop is maintained across the valve. The inherent flow characteristic can comprise an "equal percentage flow characteristic", i.e., an inherent flow characteristic which, for equal increments of rated travel, will ideally give equal percentage changes of the existing flow. The flow characteristic may also be a "linear flow characteristic", i.e., an inherent flow characteristic which can be represented ideally by a straight line on a rectangular plot of flow versus percent rated travel so the equal increments of travel yield equal increments of flow at a constant pressure drop. A round hole seat cooperating with a round hole bore in a valve ball typically achieves an equal percentage flow characteristic. The flow characteristic may also be "quick opening", i.e., the flow characteristic achieved by a V-shaped opening in the seat with the large end of the V exposed first as the ball moves toward full open position.

Rangeability is the ratio of highest to lowest controllable flow rate. The term "inherent rangeability" is defined as the ratio of maximum to minimum flow within which the deviation from the specified inherent flow characteristic does not exceed a stated limit, usually 1%. The inherent rangeability of a round hole valve can be 30 or 50 to 1, while the rangeability of a ball valve using a V-seat or a slotted seat can be 100 to 200 to 1. The advantage of using a V-seat or slotted seat is better control at both ends of the range, allowing one valve to be used instead of requiring the use of two or more valves in services having wide requirements. Moreover, valves using slotted seats provide, and valves using V-seats approach, a linear flow characteristic. With all other valve designs, inherent rangeability is rarely realized in practice. This is due to the normal procedure of selecting a valve flow coefficient ($C_v$) which exceeds that which is actually needed. This greater $C_v$ is specified because of the concern of avoiding undersizing of a valve, which can easily happen because flow and pressure data are often inaccurate, or they change due to the need to alter the process.

Other designs have limited, stepwise $C_v$ changes available, and it is only through happenstance that an exact match occurs between the required and the available $C_v$.

The valve design of the present invention overcomes these problems because there are an infinite number of $C_v$ values available between the maximum possible with a fully open, round port valve and the minimum possible with a highly restricted valve using the present invention. Therefore, the need to oversize a valve is no longer necessary because of the ease with which a $C_v$ change can be made, and because of the possibility of exactly matching the requirement. This represents a significant and drastic change in valve selection and sizing philosophy, and results in significant improvements in the accuracy and performance of control systems. The valve is the one element of control systems which has been ignored with respect to process accuracy, whereas all other elements (sensors, controllers, wiring, communications) have been exhaustively improved in order to gain higher accuracy.

Another element of the design concept embodied in the present invention relates to its contribution to the dynamic performance of the system in which it is used. As described above, it is normal to specify oversized valves; however, this is highly undesirable because oversizing makes a control loop more sensitive, since a fixed change in valve position results in a greater change in flow or pressure than would be desirable if a valve were used with the exactly-needed $C_V$. This greater-than-desired change causes excessive process sensitivity, the process "overshoots", and must be corrected by adjusting the sensitivity of another element of the control system. When this procedure, called tuning, is performed, the system becomes desensitized and the result is a process which responds slowly to changes. This slow response means that assets such as energy or raw materials are wasted. With the present invention, industry is able to make the final improvement in piping processes which will enable it to maximize performance of control loops.

Pressure recovery involves considerations of flashing, cavitation and excess noise. In the absence of pressure reduction across the valve, it is not possible to modulate or vary the flow through the valve, i.e., to control effectively and to achieve a reduction in flow, the valve must burn up pressure or energy. High recovery valves use fluid to fluid contact, i.e., turbulence, to reduce pressure, which results in cavitation, etc. A much better way to reduce the pressure recovery capability of a valve is to increase the fluid to metal contact in the valve, i.e., to increase the friction.

A ball valve which relies upon this latter concept to achieve pressure reduction in a ball valve is disclosed in Baumann U.S. Pat. No. 4,085,774. The Baumann valve includes a plate, secured in the outlet flow passage of a ball valve, that is provided with a plurality of anti-cavitation passageways which effect a high loss of kinetic energy and which reduce noise by subdividing the fluid flow through the outlet flow passage of the valve into a large number of small streams. However, the anticavitation plate in the Baumann valve is not in sealing contact with the rotatable ball of the valve; instead, the rotatable ball in the Baumann valve is of the trunnion type rather than being a floating ball, and is associated on the downstream side of the valve with a thin and flexible metal seat ring that is in sealing engagement with the ball in spaced relation to the upstream surface of the anticavitation plate to avoid excessive wear and high operating torque. Because of the space that is necessarily provided by this arrangement between the Baumann ball and anticavitation plate, when the ball is in other than the fully closed valve position, fluid leakage occurs through those passageways in the anticavitation plate which are ostensibly covered by the valve ball. As a result, there is an increase in the minimum flow which occurs through the valve when the Baumann ball is in other than its fully closed position, with a consequent significant decrease in the inherent rangeability of the valve. Since rangeability and precise control are related factors, the Baumann valve, due to said leakage, does not provide very precise control at the low end of the rangeability ratio.

The present invention is intended to obviate problems of the types discussed above with respect to the Baumann valve arrangement.

SUMMARY OF THE INVENTION

In accordance with the present invention, a ball valve, provided with a floating ball that is rotatable through substantially 90°, includes a pair of seats adjacent the upstream and downstream sides of the valve at least one of which seats is a one-piece lubricant-impregnated metal seat that makes full face direct sealing contact with the ball at all times during movement of the ball between its fully open and fully closed positions. The seat includes a concave central surface portion which defines a pattern of spaced holes extending through the seat in the direction of the axial flow passage through the valve housing, said holes providing the only paths for fluid flow through the seat, whereby the seat effects a significant reduction in the pressure of fluid flowing through the ball valve due to the fluid to metal contact of fluid passing through the holes in the seat. The full face direct sealing contact between the ball and central surface portion of the seat is operative to prevent leakage of fluid from the bore of the ball through any of the holes in the seat that are covered by a surface portion of the ball, and permits fluid to flow through only those holes in the seat that directly communicate with the bore of the ball as the ball is rotated from one position to another about its axis of rotation. Since the ball in the present invention is a floating ball, and makes full-face contact with a seat that is constructed of good bearing material, the valve need not employ a thin flexible metal seat to provide a seal between the ball and the housing as in the Baumann arrangement, and allows the ball to seal directly to the seat throughout the stroke of the ball. The holes that are shrouded are truly "off", not just flowing less. In addition, due to the floating nature of the ball, and its full-face contact with the multi-hole seat, the valve design is self-compensating for wear, and continues to seal well even after wear has occurred.

The valve achieves significantly higher inherent rangeability than can be effected in the aforementioned Baumann valve. Moreover, the inherent flow characteristic of the valve can be tailored very closely by controlling the pattern of small holes or other shapes that are spaced throughout all or part of the port hole area of the seat. A band of parallel rows of holes can be provided to achieve a linear flow characteristic, or holes can be distributed throughout the entire port hole area to achieve an equal percentage flow characteristic, or holes can be provided in one pattern in a portion of the port hole area, with the balance of the port hole area being differently patterned to provide a second and/or a third and/or a fourth pattern so that the valve exhibits different inherent flow characteristics at different portions of the ball rotation between its fully open and fully closed positions. Furthermore, substantially different flow capacities can be achieved between the full open and the partially open positions. This becomes significant for those processes in which a very wide rangeability is required. In such cases, the common practice is to "split range" the control. That is, two valves are used instead of one. The valves have different sizes and $C_v$s so that both high and low flow is available. With the valve design of the present invention, split-ranging becomes inherent to the valve, so that only one valve is needed. By using a large valve and segmenting the seat in such a manner that the flow can be very high at full open, and very low at any other position, depending on the size and density of the holes, the desired high rangeability can be accomplished with one valve. The result is significant savings in cost to the user.

In its preferred form, the multi-hole seat is provided in sealing engagement with the ball at the downstream side of the valve, with the seat at the upstream side being a standard round hole seat. In the alternative, both seats in the valve can be of the multi-hole type so that the total pressure drop between the upstream and downstream sides of the valve occurs in two steps with the inherent flow characteristic of the valve being defined by the respective hole patterns in the two seats. The multi-hole seat can also be provided adjacent only the upstream side of the valve to effect pressure reduction and a desired flow characteristic in this portion of the valve, with the downstream seat then being of the slotted seat type or of the V-seat type to further characterize the valve flow. In all such arrangements, there is a significant increase in fluid to metal contact and a consequent large improvement in the pressure recovery coefficient of the valve.

BRIEF DESCRIPTION OF THE DRAWINGS

The foregoing objects, advantages, construction and operation of the present invention will become more readily apparent from the following description and accompanying drawings wherein.

DESCRIPTION OF THE PREFERRED EMBODIMENTS

Figure 1:
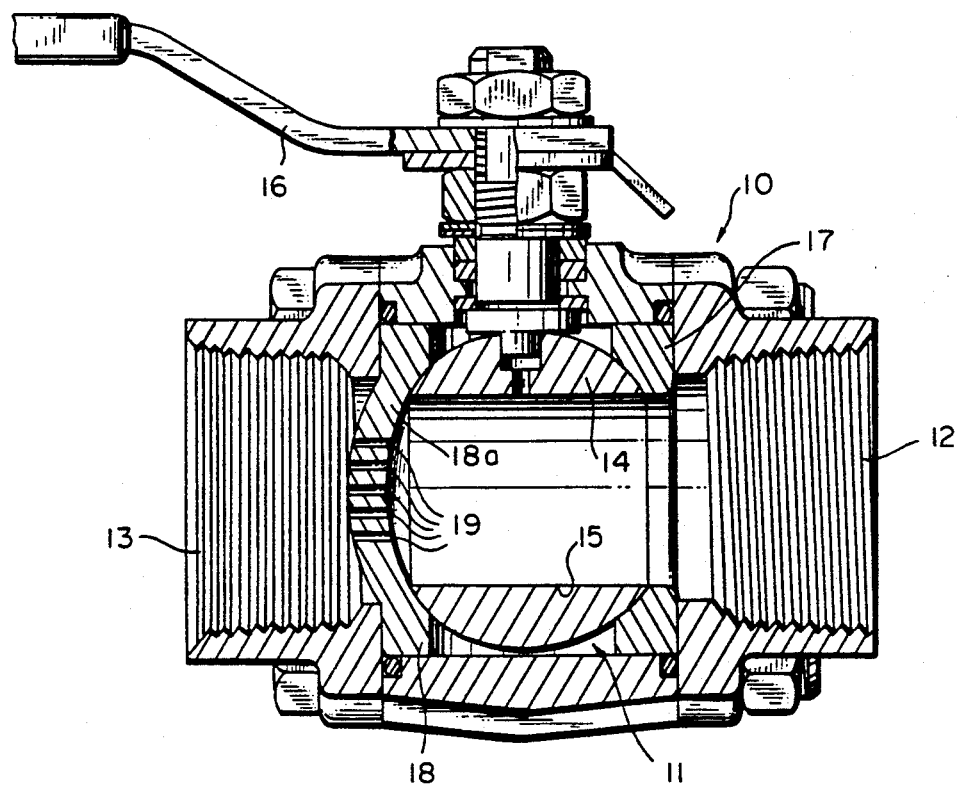
FIG. 1 is a cross-sectional view of a ball valve constructed in accordance with the present invention.
Figure 2:
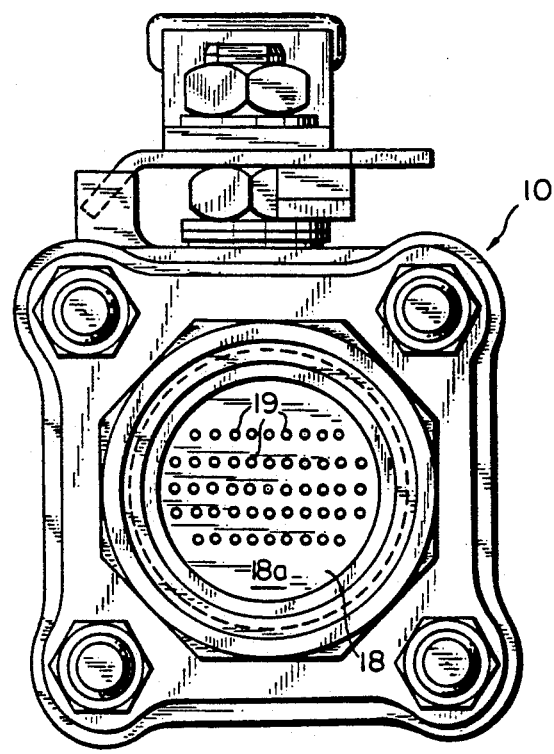
FIG. 2 is an end view of the valve shown in FIG. 1 from the multi-hole port end of the valve.

Referring initially to FIGS. 1 and 2, a ball valve constructed in accordance with the present invention comprises a housing, generally designated 10, that has an interior cavity 11 located between and communicating with a pair of fluid flow channels 12 and 13 to define an axial flow passage extending through housing 10. A ball 14 having an axially directed bore 15 is located in cavity 11, the ball being of the floating type and being rotatable through substantially 90° in said cavity about an axis of rotation transverse to the axial flow passage through the ball under the control of e.g. a manually operable handle 16 or an actuator of different type, so that the bore 15 may be selectively aligned with or disposed transverse to the axial flow passage through the housing to control the flow of fluid through the valve. These portions of the structure are in themselves conventional, and are of conventional configuration.

A pair of seats 17 and 18 are supported by housing 10 adjacent the upstream and downstream sides of cavity 11 for respective sealing engagement with housing 10 and ball 14. Upstream seat 17 may be a standard round hole seat of annular configuration, and is preferably of one-piece lubricant-impregnated metallic material, e.g., it can be a graphite-filled sintered metal seat of the type described in Smith et al, U.S. Pat. No. 4,531,273, or a polymer-impregnated sintered metal seat of the type described in Gonzalez U.S. Pat. No. 4,377,892. Downstream seat 18 is also a one-piece lubricant-impregnated metal seat fabricated of like material which is configured, however, to provide a concave central surface portion 18a that makes full face direct sealing contact with ball 14, and that defines a pattern of spaced holes 19 which extend through the seat in the direction of the axial flow passage through the valve. The holes 19 provide the only paths for fluid flow through seat 18, whereby seat 18 effects a significant reduction in the pressure of fluid flowing through the valve due to the fluid-to-metal contact of fluid passing through the holes in said seat.

Figure 3:
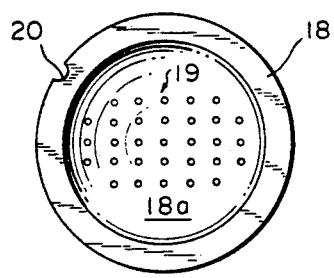
FIG. 3 is a diagrammatic illustration of a multi-hole seat of the general type utilized in FIGS. 1 and 2.

In the embodiment of the invention shown in FIGS. 1 and 2, and as diagrammatically shown in FIG. 3, the holes 19 in seat 18 can be disposed in a plurality of parallel rows that define a band of spaced holes extending across the concave central surface portion 18a of the seat. For purposes of clarity, the drawings depict fewer holes than would normally be provided; in a typical embodiment of the invention, 200 or more holes are provided. The hole sizes can be of varying dimension, can be as small as 0.02 inches in diameter, and are typically in the range of 0.03 inches to 0.04 inches in diameter. The holes are cut into the seat by use of programmable, computer-controlled laser machining equipment, but can in the alternative be provided by use of a drill press. The seats are easily modifiable by a customer to achieve any desired characteristic. For example, when valves are to be used in the control of a new process, the valves can be sized conservatively; but later, as the process is developed and/or production is increased, a valve employing a multi-hole seat can be unscrewed from the process line, the ball can be placed in open position, the assembled valve can then be placed in a drill press, and additional holes can be drilled in the seat by the user, while the valve remains assembled, to modify the inherent flow characteristic of the valve as may be desired or necessary.

In the hole pattern depicted diagrammatically in FIGS. 2 and 3, there are fewer holes in the upper and lower rows of holes than in the intervening rows. With such an arrangement, when the ball is first turned from a fully closed valve position in an opening direction, a small half-moon of the ball bore initially exposes only one or two holes in the central rows. Thereafter, after the ball has been turned to about 15% to 20% of its open position, further opening of the ball exposes a constant additional number of holes for each additional degree of ball movement. Because of the inherent shape of the ball port, and the band pattern of holes diagrammatically illustrated in FIGS. 2 and 3, the inherent flow characteristic of the valve is an equal percentage flow characteristic up to about 20% of the valve open position, but once the ball has been turned sufficiently to expose the full band, the valve exhibits a linear flow characteristic from then on to the full open position of the valve, i.e., the flow characteristic is linear for about 70% of the total range of valve rotation which, as a practical matter, is the working range of the valve.

Figure 6A:
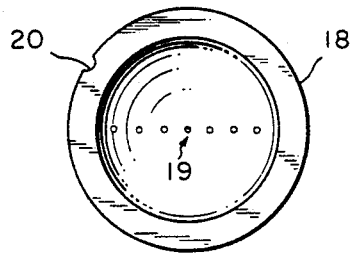
FIGS. 6a, 6b, 6c and 6d illustrate examples of other hole patterns that can be used in the multi-hole seat; and, FIGS. 7a, 7b and 7c diagrammatically depict various different types of seats that can be used in conjunction with one another adjacent the upstream and downstream sides of the ball valve.
Figure 6B:
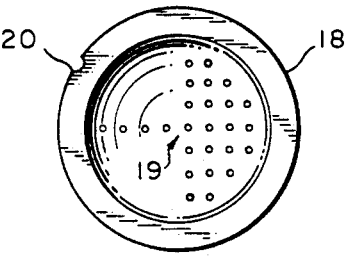
Figure 6C:
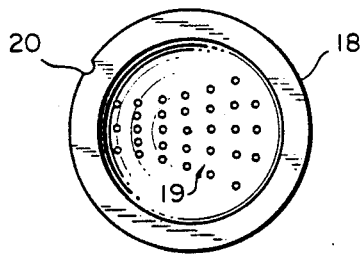
Figure 6D:
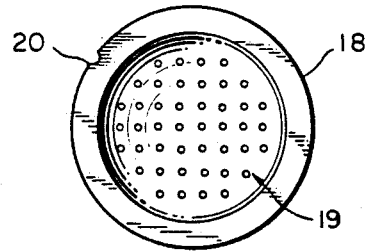

Different flow characteristics can be achieved by the different hole patterns diagrammatically illustrated in FIGS. 6a–6d. The pattern shown in FIG. 6a consists of a single row of holes extending in a direction transverse to the direction of the ball axis of rotation, and this arrangement achieves very low flow through the valve which, however, has a linear flow characteristic. The pattern shown in FIG. 6b consists of a single row of holes extending across approximately ½ the port area of the seat, followed by a pattern of holes which substantially fills the remaining half of the port area. This arrangement produces very low flow and a linear flow characteristic for approximately 50% of the ball rotation, followed by high flow and an equal percentage of flow characteristic for the remainder of the ball rotation. FIG. 6c discloses a fan pattern, or a substantially V-shaped pattern, of holes that achieves a different flow characteristic tailored to a specific application. The pattern in FIG. 6d consists of holes that substantially fill the entire port area to achieve an equal percentage flow characteristic throughout the entire range of ball rotation. Each of the seat representations shown in FIGS. 3 and 6 includes a location notch 20 which is used to properly orient the seat 18 in the housing 10 relative to rotatable floating ball 14.

Figure 4:
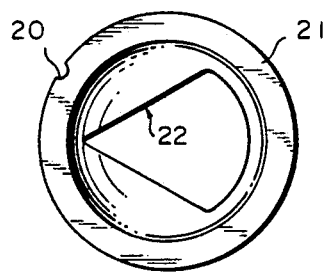
FIG. 4 illustrates a V-seat which may be used in conjunction with the multi-hole seat.
Figure 5:
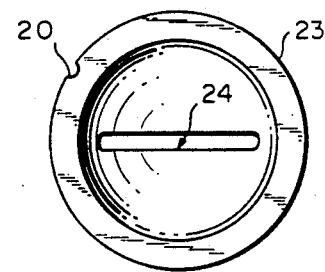
FIG. 5 depicts a slotted seat which may be employed in conjunction with the multi-hole seat.

FIG. 4 depicts a V seat 21 of known configuration that is fabricated of a graphite-filled or polymer-filled sintered metal material as described above, and which includes a concave central surface portion that defines a V-shaped opening 22 that achieves an equal percentage inherent flow characteristic. FIG. 5 depicts a slotted seat 23, also known per se and fabricated of a lubricant-impregnated metallic material as described above, which includes an elongated slot 24 extending across a concave central surface portion of the seat to achieve a linear flow characteristic. Seats of the type shown in FIGS. 4 and 5 may be used in conjunction with multi-hole seats of the types shown in FIGS. 3 or 6 to achieve characteristics that may be necessary or desirable in specific valve applications.

Figure 7A:
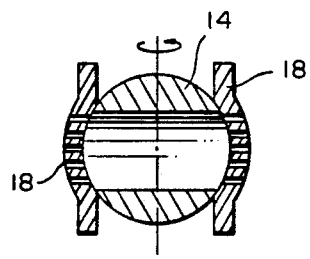
Figure 7B:
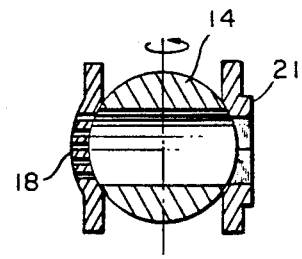
Figure 7C:
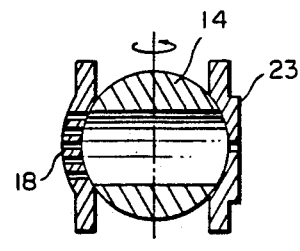

More particularly, as diagrammatically shown in FIG. 7b, the rotatable valve ball 14 may be disposed between a multihole seat 18, e.g., of the type shown in FIG. 2, and a V-seat 21 of the type shown in FIG. 4, the multi-hole seat 18 in such an arrangement preferably being disposed adjacent the upstream side of the valve and the V-seat being disposed adjacent the downstream side of the valve. Similarly, as diagrammatically depicted in FIG. 7c, the rotatable valve ball may be disposed between a multi-hole seat 18, again preferably disposed adjacent the upstream side of the valve, and a downstream slotted seat 23 of the type shown in FIG. 5. FIG. 7a discloses still another possible arrangement wherein multi-hole seats are disposed adjacent both the upstream and downstream sides of the valve.

While various hole patterns have been diagrammatically illustrated in FIGS. 2, 3 and 6, it must be understood that the arrangements depicted are intended to be illustrative only and not limitative of the present invention. Other arrangements could be employed depending upon the particular characteristics that may be desired in a given application. Merely by way of example, the hole pattern utilized could be one wherein a single row or band of holes is provided for the first 20° to 30° of ball rotation, whereafter the pattern could change to a 10° V or 20° V for the next 30° of ball rotation, followed in turn by a 180° V, i.e., a straight line of holes extending parallel to the axis of ball rotation as shown in FIG. 6b, with a remaining portion of the seat being removed entirely to provide for a flushing operation in the valve. Other possible hole patterns and/or combinations of multi-hole seats with seats having other port configurations, can be effected to achieve desired inherent flow characteristics. In all such arrangements, however, it is important that the seats be fabricated of a good bearing material of one of the types described above, and that the seats be in full face direct sealing contact with a rotatable ball of the floating type, to achieve the improved inherent rangeability and self-compensation for wear which characterizes the present invention.

Having thus described our invention we claim:

1. A ball valve having improved inherent rangeability comprising a housing having an interior cavity located between and communicating with a pair of fluid flow channels to define an axial flow passage extending through said housing, a ball located in said cavity, said ball having an axially directed bore extending therethrough and being a floating ball that is rotatable through substantially 90° about an axis of rotation transverse to said flow passage whereby said bore may be selectively aligned with or disposed transverse to the axial flow passage in said housing to control the flow of fluid therethrough, and a pair of seats supported by said housing adjacent the upstream and downstream sides of said cavity respectively for sealing engagement with said housing and ball, at least one of said seats being a one-piece lubricant-impregnated metal seat configured to provide a concave central surface portion that makes full face direct sealing contact with said ball, said concave central surface portion of said metal seat defining a pattern of spaced holes which extend through said seat in the direction of said axial flow passage, each of said holes having a diameter in the range of 0.02 to 0.04 inches, said holes providing the only paths for fluid flow through said metal seat whereby said seat effects a significant reduction in the pressure of fluid flowing through said ball valve due to the fluid to metal contact of fluid passing through said holes in said seat, said full face direct sealing contact between said ball and said central surface portion of said seat being operative to prevent leakage of fluid from said bore of said ball through any of said holes that are covered by a surface portion of said ball and to permit fluid to flow through only those holes in said seat that directly communicate with said bore of said ball as said ball is rotated from one position to another about said axis of rotation.

2. The ball valve of claim 1 wherein a pair of said lubricant-impregnated metal seats, configured as described and each having a pattern of holes therein whose diameters are in the range of 0.02 to 0.04 inches in diameter, are respectively disposed adjacent the upstream and downstream sides of said cavity.

3. The ball valve of claim 1 wherein said holes are disposed in a plurality of parallel rows of holes that extend across said central surface portion of said seat in directions transverse to the axis of rotation of said ball.

4. The ball valve of claim 1 wherein said pattern of holes is a single row of holes extending across said central surface of said seat in a direction transverse to said axis of rotation of said ball.

5. The ball valve of claim 1 wherein at least a portion of said pattern of holes is a V-shaped pattern.

6. The ball valve of claim 1 wherein said pattern of holes is such that, as said ball is rotated from a fully closed to a fully open position in said valve, for at least 70° of the 90° rotatability of said ball each additional degree of ball movement toward the fully open position of said ball exposes a constant additional number of holes to the bore of said ball.

7. The ball valve of claim 1 wherein said pattern of holes comprises a plurality of parallel rows of closely spaced holes that substantially fill the entire area of the central surface portion of said seat that is exposed to the bore of said ball when said bore is aligned with the axial flow passage in said housing.

* * * * *